United States Patent [19]  [11] 4,242,939
Osborne et al.  [45] Jan. 6, 1981

[54] BLIND FASTENER

[75] Inventors: Michael L. Osborne, Sutton Coldfield; Michael J. Hadley, Great Barr, both of England

[73] Assignee: USM Corporation, Farmington, Conn.

[21] Appl. No.: 950,586

[22] Filed: Oct. 12, 1978

[30] Foreign Application Priority Data

Oct. 15, 1977 [GB] United Kingdom ............... 42995/77

[51] Int. Cl.³ .............................................. F16B 13/04
[52] U.S. Cl. ......................................... 411/41; 411/60; 411/70
[58] Field of Search .................... 85/81, 80, 79, 83, 84, 85/72, 5 M, 5 E, 71, 77, 78, 75, 74, 73, 38; 24/73 P, 73 PF

[56] References Cited

U.S. PATENT DOCUMENTS

| 1,202,159 | 10/1916 | Camden | 85/83 |
| 1,234,487 | 7/1917 | Raeger | 85/83 |
| 2,371,470 | 3/1945 | Rossmann | 85/81 |
| 2,997,910 | 8/1961 | Tinnerman | 85/77 |
| 3,074,134 | 1/1963 | Buechler | 85/72 X |
| 3,115,804 | 12/1963 | Johnson | 85/4 |
| 3,333,499 | 8/1967 | Rudd | 85/38 |

FOREIGN PATENT DOCUMENTS 2607689 9/1976 Fed. Rep. of Germany ............. 85/71
1111404 4/1968 United Kingdom .

Primary Examiner—Ramon S. Britts
Attorney, Agent, or Firm—Aubrey C. Brine; Vincent A. White

[57] ABSTRACT

A plastics pull-type blind fastener has a pull-part with a pulling stem and legs which pass through holes in a workpiece, shoulders of the legs engaging the workpiece at the blind side, and a push-part with a head to engage the workpiece at the accessible side and a plug extending between the legs to keep them apart after setting. The legs are accommodated in complementary shaped apertures in the head of the push-part, and at least one part has teeth to lock the parts together after setting, and allow removal of the pulling stem.

10 Claims, 9 Drawing Figures

U.S. Patent     Jan. 6, 1981     Sheet 1 of 2     4,242,939
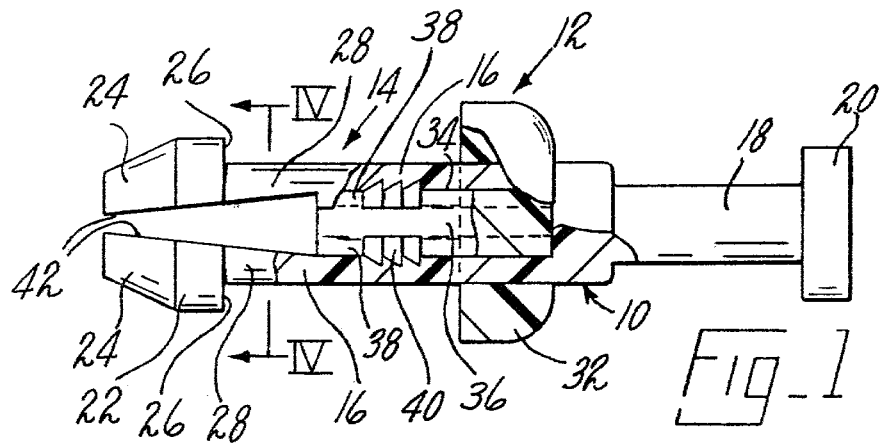
Fig_1
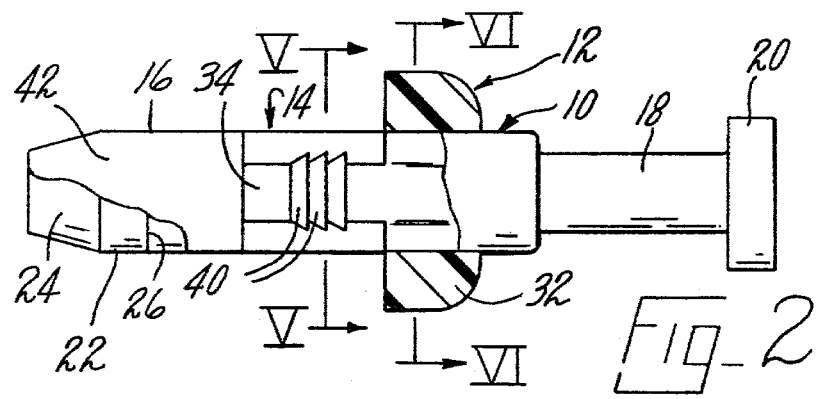
Fig_2
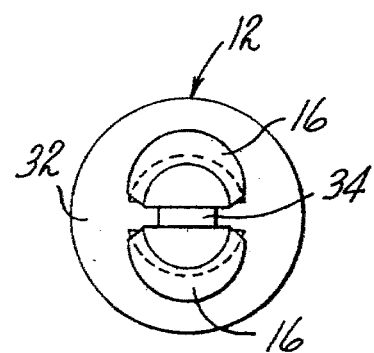
Fig_3
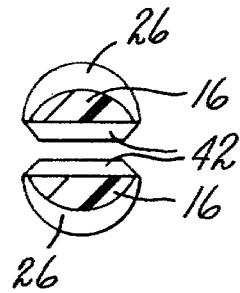
Fig_4

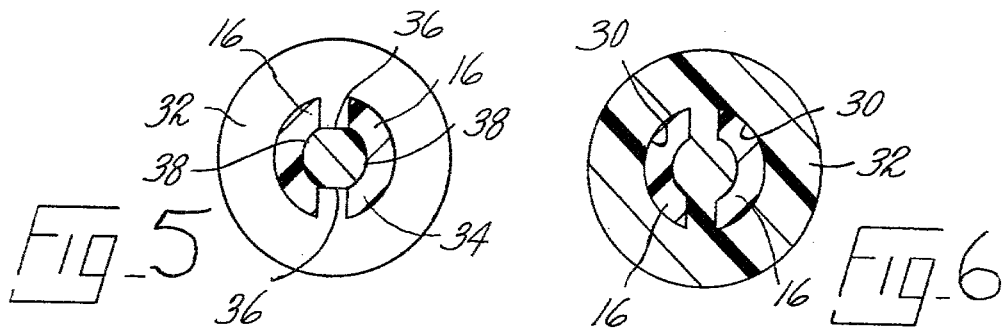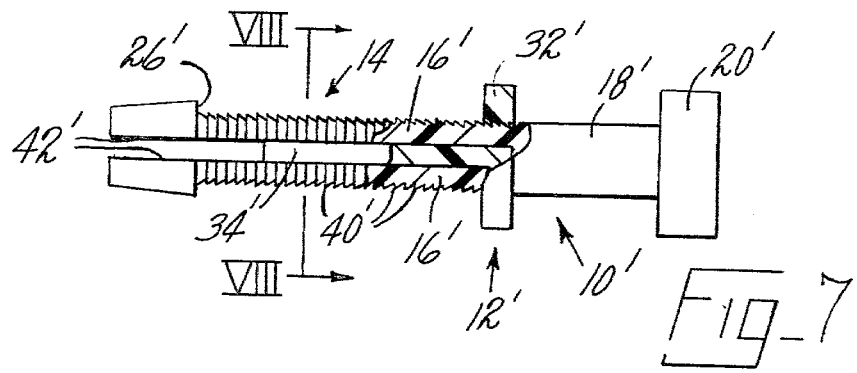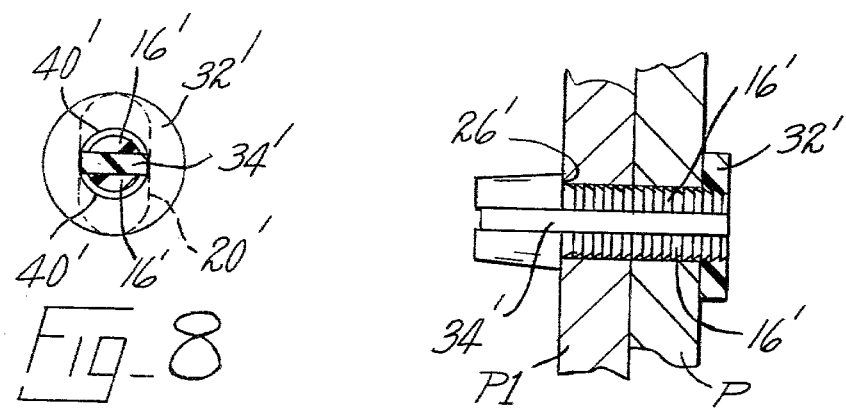

BLIND FASTENER

BACKGROUND OF THE INVENTION

This invention is concerned with pull-type blind fasteners, that is to say with fasteners of a kind comprising a push-part having a head for engagement with the exposed side of a workpiece and a pull-part which passes through said head and projects as a pulling stem therefrom, a shank provided by one of said parts being effective when the shank has been inserted through aligned holes in a workpiece and the stem is pulled to engage the workpiece at the blind side to clamp it against said head. The fastener also has means for effecting inter-engagement between the two parts to lock them in set relationship and to hold them together on removal of the pulling stem.

Metal pull-type blind rivets have been known for many years, one brand having manufactured and widely marketed by the company assignee of the present invention under the registered trademark "POP." Such rivets have a rivet body, or "push-part," and a mandrel or "pull-part," which may be pulled right through the rivet body, or broken to leave a head part in the set rivet, or may be subsequently trimmed to remove the stem projecting from the rivet head after setting. Metal pull-type blind rivets enable reliable and permanent riveted joints to be made in workpieces comprising sheet metal panels, for example, to which access is available from only one side, and may be designed not only to give strong joints with the parts of the workpiece tightly clamped together but also to afford a high degree of pulling together of the parts of the workpiece if, as is very common, there is a small gap between them at the beginning of the riveting operation.

Among the wide variety of applications for which blind rivets are used are some for which metal is regarded as undesirable, if not altogether unsuitable. Electrical insulation, lightness in weight, choice of color, for example, are factors which have led to the introduction of plastic blind fasteners. However, such plastic fasteners, especially those which resemble pull-type blind rivets in appearance, usually suffer from a very low ability to pull parts of a workpiece together, and very low residual clamping force in the set fastener.

An example of a two-piece plastic pull-type blind fastener which has been proposed is one comprising a part which is pushed, i.e. a "push-part," and which has an annular head with a hollow shank projecting forwardly from it for insertion in a hole in a workpiece, and a pull-part accommodated in the shank and having a stem projecting from the head of the push-part so that it can be pulled. The push-part of this fastener has two diametrically opposed slots running along an intermediate portion of the shank between the head and an annular wall at its tail end and the pull-part extends beyond the shank and there, has a head of the same diameter as the outer diameter of the annular wall so that, when the pull-part is pulled, the head abuts the wall and the intermediate portion of the shank splays out like two elbows to engage the blind side of the workpiece. Teeth may be found on the pull-part so that they dig into the material of the head of the push-part and lock the two parts of the fastener together in set position more firmly than relying on friction, the two parts thus remaining in their set condition when the portion of the pull-part projecting from the head of the push-part is trimmed off.

The fastener can be made by injection molding the pull-part first and then the push-part over it. Whereas this particular example of a plastic blind fastener has generally adequate strength and an ability of pull parts of a workpiece together, the range of workpiece thickness with which it can be used is limited and it requires relatively complex tooling for its manufacture.

It is an object of the present invention to provide an improved blind fastener which can be made economically of plastic material and which will yet exhibit a high degree of ability to pull together parts of a workpiece, and hold them tightly clamped after setting.

SUMMARY OF THE INVENTION

Two pull-type blind fasteners in accordance with the invention are hereinafter described in detail to illustrate the invention by way of example, each of these illustrative fasteners comprising two intercooperating parts, each of resilient plastic material of a thermoplastic nature so that they can be injection molded. The pull-part of each of the illustrative fasteners has an elongated shank provided by a plurality, e.g. two, legs, the legs being joined at rear ends to a pulling stem, which has a head at its rear end by which is can be held by a pulling device of a suitable setting tool. Each leg of the pull-part, at its forward, free, end, has a shoulder which projects beyond the periphery of that part of the shank which lies behind the shoulder so that the shoulder, after the leg has been radially bent inwardly on insertion of the shank in a hole to permit the shoulders of the legs to pass through can, on recovery of the legs to a relaxed condition, overlie the workpiece around the hole at the blind side.

The push-part of each of the illustrative fasteners has a head to engage the workpiece around the hole at the accessible side from which the shank is inserted and a plug which projects forwardly from the head, part way along the shank, where it is accommodated between the legs. The legs of the shank, in the case of each of the illustrative fasteners, pass through apertures of complementarily shaped cross-section in the head of the push-part, the arrangement being such that the push-part can slide along the shank to advance the plug to a position between the shoulders of the legs.

In using the illustrative fasteners for securing two parts of a workpiece together, the shank of the fastener is inserted through aligned holes in the parts of the workpiece, the shoulder portions of the legs being resiliently urged inwardly to permit the shoulders to pass right through the workpiece, and, on recovery of the legs to a relaxed condition when the shoulders are beyond the blind side, to overlie the periphery of the hole. The legs of the shanks of the illustrative fasteners at their free ends are close enough together in their relaxed condition to engage one another and provide an axis about which the shoulders pivot when they are constrained to pass through the hole. By means of a suitable blind-rivet setting tool, the pull-part is then pulled by a chuck of the tool while a nosepiece of the tool pushes against the head of the push-part thus to cause the shoulders of the shank legs and the head of the push-part to be urged together first to draw together the parts of the workpiece (if there is a gap between them) and then clamp them tightly, with the plug of the push-part now sufficiently advanced along the shank to lie between the shoulders and hold them apart in overlying relationship with the workpiece around the hole at the blind side.

Each of the illustrative fasteners comprises means for effecting such inter-engagement of the two parts that movement of separation of the head of the push-part and the shoulders of the shank legs, after the fastener has clamped the workpiece, is prevented, such means being so incorporated in the fastener that such separation will not occur even though the portion of the pull-part projecting from the head of the push-part is removed. In one of the illustrative fasteners such means comprises teeth on the plug of the push-part which inter-engage with the inner walls of the legs of the pull-part. In the other of the illustrative fasteners, such means comprises teeth on the outer wall of the legs of the shank, which inter-engage with the outer walls of the apertures in the head of the push-part through which the legs pass. In each case, the portion of the pull-part projecting from the head of the locking member is cut off, preferably by cutting means of the setting tool, to sever the legs flush with the head of the push-part and thus leave a fastener of pleasing appearance at the accessible side of the workpiece. Severing of two relatively thin legs is usually easier than severing a solid stem of similar material and cross sectional area.

The illustrative fasteners are simple and quick to insert and set, not electrically conductive, light in weight and, besides being of pleasing appearance, can readily be molded in selected colors, the two parts being of the same color, or, if preferred, of different colors. They can be set in workpieces of widely varying thickness.

The illustrative fasteners can be made economically by injection molding, the part provided with the teeth first, and then the other part molded directly onto it. Thus, the said other part may readily be molded with grooves complementary to at least some of the teeth.

The invention provides, in one of its several aspects, a two-part pull-type blind fastener comprising a pull-part having a shank provided by a plurality of legs, the legs being joined at rear ends to a pulling stem and at their other, free, forward ends having external, rearwardly facing, shoulders, and a push-part axially slidable on said shank and comprising both a head which surrounds the shank, the shank legs passing through apertures in the push-part and a plug projecting forwardly from said head, the plug being accommodated in, and extending part way along, the shank and capable, after the shank has been inserted through a hole in a workpiece and the plug has been advanced to a position between said shoulders, of holding the legs apart with the shoulders overlying the workpiece around the hole at the blind side. The fastener also comprises means for effecting such inter-engagement of the two parts that movement of separation of the head of the push-part and the shoulders of the shanks legs is prevented, after they have been urged towards one another to clamp the workpiece therebetween and the portion of the pull-part projecting from the head of the push-part has been removed.

The two parts of a blind fastener in accordance with the invention may be made of the same material, or they may be made of different materials, whether plastic or metal. To facilitate injection molding of one part directly onto the other, the parts are preferably of different thermoplastic materials, that part molded first having a higher softening temperature than the second. The shank member is desirably resilient, and essentially so where, as in the case of the illustrative fasteners, the legs have to yield inwardly as they pass through a hole in the workpiece; the locking member may be of a harder material, especially if it has teeth on it to inter-engage with the other parts. Nylon 66 and "DELRIN," a brand of acetal resin, are suitable materials of similar hardness to one another, the nylon having the higher softening point. Polycarbonate is a suitable harder material for the locking member, where this is desired.

Where, as is the intended use of the illustrative fasteners, fasteners in accordance with the invention are used merely to fasten parts of a workpiece together, the heads of the locking members may be round and smooth or of any other desirable shape for ornamental purposes. The locking members of fasteners in accordance with the invention may, however, be shaped to serve functional purposes, for example as retaining devices or clips for trims, pipes, electrical leads, etc., or as hooks.

BRIEF DESCRIPTION OF THE DRAWING

There now follows a detailed description, to be read with reference to the accompanying drawing, of the illustrative fasteners aforementioned. It will be realized that these illustrative fasteners have been selected for description by way of example and not of limitation of the invention.

In the accompanying drawing:

FIG. 1 is a view, partly in longitudinal section, of the first illustrative fastener, viewed from a position normal to its axis;

FIG. 2 is a view, similar to FIG. 1, but from a position at 90° around the axis of the fastener;

FIG. 3 is a view of the illustrative fastener from its tail or leading, end (at the left of FIG. 1);

FIG. 4 is a view of the first illustrative fastener in cross-section on the line IV—IV of FIG. 1;

FIGS. 5 and 6 are views of the first illustrative fastener in cross-section on the lines V—V and VI—VI of FIG. 2;

FIG. 7 is a view, similar to FIG. 1, but of the second illustrative fastener;

FIG. 8 is a view in cross-section of the second illustrative fastener on the line VIII—VIII of FIG. 7; and FIG. 9 is a view, similar to FIG. 7, but showing the second illustrative fastener installed in a workpiece.

DESCRIPTION OF THE PREFERRED EMBODIMENTS

The first illustrative blind fastener (FIGS. 1-6) consists of a pull-part 10 and a push-part 12. The pull-part 10 comprises a shank 14 formed by two resilient legs 16 joined at their rear ends to a pulling stem 18 of the pull-part 10. The stem 18 has a head 20.

Each of the legs 18 of the first illustrative fastener has, at its free, leading, end a thickened portion 22 with a forwardly tapering surface 24 and a rearwardly facing external shoulder 26 lying in a plane at right angles to a longitudinal axis of the shank. Outer surfaces 28 of the legs behind the shoulders are part cylindrical and smooth and pass through complementarily shaped apertures 30 (FIG. 6) in the push-part 12. The push-part 12 of the first illustrative fastener has a head 32, in which the apertures 30 are provided, the head thus surrounding the shank 14, and also comprises a plug 34 which projects forwardly from the head 32 and is accommodated between the legs 16 along which it extends part way towards the shoulders 26. The plug 34 has two opposing flat sides 36 (FIG. 5) joined by symmetrically disposed part cylindrical surfaces 38. On the surfaces 38 are formed three ratchet shaped arcuate teeth 40 (FIGS.

1 and 2), their inclined sides facing forwardly, their rear sides being normal to the axis of the plug.

The plug 34 of the push-part 12 of the first illustrative fastener extends about half way along the shank 12 from the head 32. In front of the plug, inner walls 42 of the legs 16 of the shank are flat and converge towards one another in the direction of the free ends of the legs. At their free ends, the legs are close enough together that, when the shank 14 is inserted in a hole in a workpiece of a diameter which will receive, and be substantially filled by, the part of the shank lying between the shoulders 26 and the head 32, the ends of the walls 42 will meet and provide a pivotal axis about which the shoulders 26 will pivot as the legs 16 resiliently yield more towards each other to allow the thickened portions 22 to pass right through the hole. After so passing right through, the legs relax and the shoulders 28 overlie the periphery of the hole of the blind side of the workpiece. The foregoing feature that the shoulders 26 pivot about the point of contact of the free end of the legs on inserting the shank 14 into the hole, provides effective safeguard against accidential withdrawal of the shoulders through the hole before the plug 34 has been advanced between them.

The shank 14 of the first illustrative fastener may be inserted in a hole in a workpiece as just described and the head 20 of the pull-part 10 is pulled and the head 32 of the push-part 12 pushed, by means of a suitable blind rivet setting tool, to urge the head 32 and shoulders 26 towards one another, such action first drawing together parts of the workpiece (if the shank has been inserted through aligned holes in parts which are not touching) and finally clamping the workpiece firmly. At such stage, the teeth 40 of the plug 34, embedded in the inner walls of the legs (or accommodated in complementary grooves in the walls 42) prevent movement of separation of the shoulders 26 and head 32. The portion of the pull-part 10 (including the stem 18) then projecting from the head 32 of the push-part 12 now may be removed by severing the legs 16 flush with the head 32 by cutting means incorporated in the setting tool. Such severance is facilitated by the relatively thin cross-section of the two legs where they pass through the apertures 30, thus to leave a fastener which is of pleasing appearance on the accessible side of the workpiece.

The first illustrative fastener is made by injection molding thermoplastic resinous material, for example the push-part 12 of Nylon 66 and the pull-part 10 of "DELRIN" acetal resin. The push-part is molded first and introduced into the mold into which the acetal resin is injected to form the pull-part directly on the push-part. Made in this way, surfaces of the pull-part in contact with those of the push-part are complementary in shape, which results, inter alia, in the formation of the grooves (already mentioned) on the inner walls 42 of the legs 16 complementary to the teeth 40 on the plug 34, and an overall internal configuration of the shank complementary to the surface of the plug except for the longitudinal slots which separate the legs 16. Thus the walls 42 are part cylindrical where they are in contact with the surfaces 28 of the locking member; such cylindrical surfaces, or conical surfaces, can be provided on the converging portions of the walls beyond the plug, if preferred to the walls being flat as already described. Alternatively, the plug could be a square cross-section with straight teeth on opposite walls, though arcuate teeth engaging cylindrical walls, as already described, are preferred to effect good filling of the hole in the workpiece and reliable locking-together of the two parts of the fastener. If a fastener having a plug with a flat sided shank is selected, however, it is preferably of rectangular cross-section, its broader faces extending across the whole complementary flat inner faces of the legs and filling the gap between them.

The second illustrative fastener (FIGS. 7, 8 and 9) is in many respects similar to the first one, but the locking teeth are provided on the legs of the pull-part instead of on the plug of the push-part. Like reference numerals, suffixed by a dash, are used in FIGS. 7, 8 and 9 for parts corresponding to those of the first illustrative fastener.

Referring to FIG. 7, the teeth 40' are on the outside of the legs 16' and face the opposite way to the teeth 40 of the plug 4 of the first illustrative fastener, their sides normal to the axis of the shank facing the free ends of the legs. The inside walls 42' of the shank legs 16' are flat and parallel right up to the tail end of the fastener, the plug 34' being rectangular in cross-section. Such configuration of the legs and plug simplifies the tooling for injection molding.

The second illustrative fastener is made by a similar two-stage injection molding procedure as the first one, but the shank member 10' is molded first. Thus, grooves complementary to the teeth 40' are formed in the walls of the aperture 30' in the head 32' of the push-part. The teeth 40' extend over most of the length of the shank legs 16', and locking is achieved, on clamping a workpiece, by inter-engagement of the grooves in the head of the push-part with whichever of the teeth on the legs they have come into engagement with. (If teeth are not provided on that part of the legs onto which the push-part is molded, the teeth on setting of the fastener, will dig into the material of the head of the push-part).

It will be observed that the head 32' of the push-part 12' of the second illustrative fastener is thinner than the head 32 of the first illustrative fastener. This is because, since the teeth 40' are engaged directly by the head 32', less load has to be transmitted by the head to the plug when advancing the plug along the shank than is the case with the first illustrative fastener.

FIG. 9 shows the second illustrative fastener installed in a workpiece consisting of two plates P, P1 after the stem 18' has been removed flush with the head 32'.

It will be realized that both illustrative fasteners can be made with legs of any desired length and are capable of being set in workpieces of any thickness which can be accommodated between the heads 32, 32' of the push-parts and the shoulders 26, 26' of the legs.

We claim:

1. A two-part pull-type blind fastener comprising a pull-part having a shank provided by a plurality of legs, the legs joined at rear ends to a pulling stem and at their other, free, forward ends having external, rearwardly facing shoulders lying in a plane at right angles to a longitudinal axis of said shank, and a push-part axially slidable on said shank, the shank legs passing through apertures in the push-part, and a plug projecting forwardly from said head, the plug being accommodated in, and extending part way along, the shank and capable, after the shank has been inserted through a hole in a workpiece and the plug has been advanced to a position between said shoulders, of holding the legs apart with the shoulders overlying the workpiece around the hole at the blind side, the fastener also comprising means for effecting such interengagement of the two parts that movement of separation of the head of the push-part and the shoulders of the shank legs, after they have been urged towards one another to clamp the workpiece therebetween and the portion of the pull-part projecting from the head of the push-part has been removed, is prevented.

2. A fastener according to claim 1, the legs of the pull-part of which are resilient, the shoulders, in the relaxed condition of the legs, projecting beyond the periphery of that part of the shank lying between the shoulders and the head of the push-part, and the legs being able to yield radially inwardly when the shank is inserted through a hole in the workpiece to allow the shoulders, on recovery of the legs from deformation, to engage the workpiece around the hole at the blind side before the plug of the push-part is advanced between them.

3. A fastener according to claim 1 in which inner walls of the legs beyond a leading end of the plug converge towards one another in the direction of the free ends of the legs.

4. A fastener according to claim 1, the legs of which at their free ends are close enough together in their relaxed condition to engage one another and provide an axis about which the shoulders pivot when they are constrained to pass through a hole in a workpiece.

5. A fastener according to claim 1 in which the means for effecting interengagement of the two parts as aforesaid comprises teeth on one of the two parts.

6. A fastener according to claim 5 in which the teeth are provided on the plug of the push-part.

7. A fastener according to claim 1 in which the teeth are provided on the legs of the pull-part.

8. A fastener according to claim 1 in which the teeth are provided on the outside of the legs.

9. A fastener according to claim 1 in which the plug of the push-part is solid.

10. A fastener according to claim 1 in which the two parts of which are made of plastics material.

* * * * *